US011360368B2

(12) United States Patent
Anderson et al.

(10) Patent No.: US 11,360,368 B2
(45) Date of Patent: Jun. 14, 2022

(54) SEMICONDUCTOR ELECTRO-OPTICAL MODULATOR

(71) Applicant: MACOM Technology Solutions Holdings, Inc., Lowell, MA (US)

(72) Inventors: Sean P. Anderson, Macungie, PA (US); Haike Zhu, Allentown, PA (US)

(73) Assignee: MACOM Technology Solutions Holdings, Inc., Lowell, MA (US)

(*) Notice: Subject to any disclaimer, the term of this patent is extended or adjusted under 35 U.S.C. 154(b) by 0 days.

(21) Appl. No.: 16/999,930

(22) Filed: Aug. 21, 2020

(65) Prior Publication Data

US 2022/0057690 A1 Feb. 24, 2022

(51) Int. Cl.
*G02F 1/225* (2006.01)
*G02F 1/21* (2006.01)

(52) U.S. Cl.
CPC .......... *G02F 1/2255* (2013.01); *G02F 1/2257* (2013.01); *G02F 1/212* (2021.01)

(58) Field of Classification Search
CPC ....... G02F 1/212; G02F 1/2255; G02F 1/2257
USPC ........................................................ 385/1–3
See application file for complete search history.

(56) References Cited

U.S. PATENT DOCUMENTS

| 7,747,122 | B2 | 6/2010 | Shetrit et al. | |
| 9,841,618 | B1* | 12/2017 | Poulin | G02F 1/025 |
| 2019/0324345 | A1* | 10/2019 | Vera Villarroel | G02F 1/2257 |

OTHER PUBLICATIONS

Doerr, Christopher R., "Silicon photonic integration in telecommunications" Frontiers in Physics, Aug. 5, 2015, doi:10.3389/fphy. 2015.00037, 16 pgs.
G. L. Li, C. K. Sun, S. A. Pappert, W. X. Chen, and P. K. L. Yu, "Ultrahigh-Speed Traveling Wave Electroabsorption Modulator—Design and Analysis" (1999). IEEE Transactions on Microwave Theory and Techniques. 47(7), pp. 1177-1183.
Spickermann, R., et al., "GaAs/AlGaAs Traveling Wave Electro-optic Modulators," SPIE vol. 3006, pp. 272-279 (8 pgs).

* cited by examiner

*Primary Examiner* — Michael P Mooney
(74) *Attorney, Agent, or Firm* — Faegre Drinker Biddle & Reath LLP

(57) ABSTRACT

Semiconductor electro-optical modulators which receives an input optical signal and provides a modulated output optical signal based on an input electrical signal are disclosed. The semiconductor electro-optical modulator may comprise at least one electrical transmission line adapted to carry the input electrical signal and a semiconductor electro-optical phase shifter waveguide electrically coupled to the at least one electrical transmission line. An optical path length of the semiconductor electro-optical phase shifter waveguide between a modulation begin plane of the semiconductor electro-optical modulator and a modulation end plane of the semiconductor electro-optical modulator may be greater than an electrical path length of the electrical transmission line between the modulation begin plane of the semiconductor electro-optical modulator and the modulation end plane of the semiconductor electro-optical modulator.

19 Claims, 12 Drawing Sheets

SEMICONDUCTOR ELECTRO-OPTICAL MODULATOR

FIELD

The present disclosure relates to electro-optical modulators and in particular to semiconductor based electro-optical modulators.

BACKGROUND

Widely used electro-optical modulator architecture mates an electrical transmission line to an electro-optical phase shifter. An electrical drive signal propagates along the electrical transmission line and is used to modulate light traveling alongside it in a semiconductor phase shifter.

Referring to FIG. 1, a traditional semiconductor electro-optical modulator 10 is represented. An electrical transmission line 12 is electrically coupled to a semiconductor electro-optical phase shifter waveguide 14. As is known, the semiconductor electro-optical phase shifter waveguide 14 includes a p-doped semiconductor portion 16 and a n-doped semiconductor portion 18. Semiconductor electro-optical phase shifter waveguide 14 includes multiple segments (14A and 14B illustrated) which are optically coupled together through undoped waveguide segments 20.

Electrical transmission line 12 carries a radio frequency (RF) electrical drive signal including a bias voltage and at least one electrical data signal supplied by at least one RF source 30 electrically coupled to electrical transmission line 12. The electrical drive signal propagates along the electrical transmission line 12 and is used to modulate light traveling alongside it in the semiconductor electro-optical phase shifter waveguide 14. Electrical transmission line 12 is electrically coupled to semiconductor electro-optical phase shifter waveguide 14 through a plurality of spaced apart electrical connectors 22 (an exemplary one marked with reference numbers) including a conductive contact 24 adjacent p-doped portion 16 of semiconductor electro-optical phase shifter waveguide 14 and a conductive connecter 26 electrically coupling the conductive contact 24 to electrical transmission line 12. N-doped portion 18 of semiconductor electro-optical phase shifter waveguide 14 is similarly electrically coupled to a reference voltage line 28, illustratively ground, through electrical connectors 32 (an exemplary one marked with reference numbers) including a conductive contact 34 adjacent n-doped portion 18 of semiconductor electro-optical phase shifter waveguide 14 and a conductive connector 36 electrically coupling conductive contact 34 to reference voltage line 28.

The light propagating along semiconductor electro-optical phase shifter waveguide 14 is provided by a light source, such as laser 40 which is optically coupled to semiconductor electro-optical phase shifter waveguide 14. As is known, the voltage of the RF drive signal alters the number of carriers in p-doped semiconductor portion 16 of semiconductor electro-optical phase shifter waveguide 14 which in turn alters the index of refraction of semiconductor electro-optical phase shifter waveguide 14 in that region. This changing of the index of refraction of semiconductor electro-optical phase shifter waveguide 14 over time modulates the time-varying RF signal onto the light carried by semiconductor electro-optical phase shifter waveguide 14. The light exits semiconductor electro-optical phase shifter waveguide 14 and is coupled into an output device, such as a fiber optic 42.

As is known, the group velocity of the light traveling along semiconductor electro-optical phase shifter waveguide 14 is greater than the group velocity of the RF drive signal traveling along electrical transmission line 12. Undoped waveguide segments 22 traditionally are interposed between sections of semiconductor electro-optical phase shifter waveguide 14, such as sections 14A and 14B of semiconductor electro-optical phase shifter waveguide 14, to account for this group velocity mismatch. These undoped waveguide segments 22 increase the insertion loss of traditional semiconductor electro-optical modulator 10. Along with the cost of the inclusion of these undoped waveguide segments 22, the increase in insertion loss may cause the need to use a higher power laser 30 to provide a signal to fiber optic 42 of sufficient strength.

SUMMARY

In an exemplary embodiment of the present disclosure, a semiconductor electro-optical modulator which receives an input optical signal and provides a modulated output optical signal based on an input electrical signal is provided. The semiconductor electro-optical modulator comprising: at least one electrical transmission line adapted to carry the input electrical signal; a semiconductor electro-optical phase shifter waveguide having a p-doped portion and a n-doped portion, an input end adapted to receive the input optical signal, and an output end whereat the modulated output optical signal exits the semiconductor electro-optical phase shifter waveguide; and a plurality of electrical connectors electrically coupling the at least one electrical transmission line to the semiconductor electro-optical phase shifter waveguide. The semiconductor electro-optical phase shifter waveguide having a modulation begin plane corresponding to a connection of a first electrical connector of the plurality of electrical connectors to the semiconductor electro-optical phase shifter waveguide and a modulation end plane corresponding to a connection of a second first electrical connector of the plurality of electrical connectors to the semiconductor electro-optical phase shifter waveguide. An optical path length of the semiconductor electro-optical phase shifter waveguide between the modulation begin plane and the modulation end plane is greater than an electrical path length of the electrical transmission line between the modulation begin plane and the modulation end plane.

In an example thereof, the optical path length of the semiconductor electro-optical phase shifter waveguide is linear.

In another example thereof, the optical path length of the semiconductor electro-optical phase shifter waveguide includes a non-linear portion. In a variation thereof, the non-linear portion of the semiconductor electro-optical phase shifter waveguide includes a first portion having a constant curvature. In another variation thereof, the semiconductor electro-optical phase shifter waveguide further includes a linear portion. In a further variation thereof, the linear portion of the semiconductor electro-optical phase shifter waveguide is parallel to the electrical transmission line. In yet a further variation thereof, the linear portion of the semiconductor electro-optical phase shifter waveguide is angled relative to the electrical transmission line. In still another variation thereof, the linear portion of the semiconductor electro-optical phase shifter waveguide is perpendicular to the electrical transmission line.

In a further example thereof, the plurality of electrical connectors further includes: a third electrical connector positioned along the optical path length of the semiconductor electro-optical phase shifter waveguide at a first location between the modulation begin plane and the modulation end plane and connected to the electrical transmission line at a second location along the electrical transmission line between the modulation begin plane and the modulation end plane; and a fourth electrical connector positioned along the optical path length of the semiconductor electro-optical phase shifter waveguide at a third location, the third location being further along the optical path length of the semiconductor electro-optical phase shifter than the first location, and connected to the electrical transmission line at a fourth location along the electrical transmission line, the fourth location being further along the electrical transmission line than the second location. In a variation thereof, the third location of the fourth connector of the plurality of connectors is closer to the modulation begin plane than the first location of the third connector of the plurality of connectors.

In a further yet example thereof, the semiconductor electro-optical phase shifter waveguide is positioned on both a first side of the electrical transmission line and a second side of the electrical transmission line, opposite the first side.

In another exemplary embodiment of the present disclosure, a semiconductor electro-optical modulator which receives an input optical signal and provides a modulated output optical signal based on an input electrical signal is provided. The semiconductor electro-optical modulator comprising: at least one electrical transmission line adapted to carry the input electrical signal; a semiconductor electro-optical phase shifter waveguide having a p-doped portion and a n-doped portion, an input end adapted to receive the input optical signal, and an output end whereat the modulated output optical signal exits the semiconductor electro-optical phase shifter waveguide; and a plurality of electrical connectors electrically coupling the at least one electrical transmission line to the semiconductor electro-optical phase shifter waveguide. The semiconductor electro-optical phase shifter waveguide extending from a modulation begin plane corresponding to a connection of a first electrical connector of the plurality of electrical connectors to the semiconductor electro-optical phase shifter waveguide to a modulation end plane corresponding to a connection of a second first electrical connector of the plurality of electrical connectors to the semiconductor electro-optical phase shifter waveguide. The semiconductor electro-optical phase shifter waveguide is angled relative to the electrical transmission line between the modulation begin plane and the modulation end plane resulting in a separation between the semiconductor electro-optical phase shifter waveguide and the electrical transmission line varies between the modulation begin plane and the modulation end plane.

In an example thereof, the electrical transmission line is linear between the modulation begin plane and the modulation end plane. In a variation thereof, the semiconductor electro-optical phase shifter waveguide is linear between the modulation begin plane and the modulation end plane.

In another example thereof, the semiconductor electro-optical phase shifter waveguide is linear between the modulation begin plane and the modulation end plane.

In a further example thereof, the semiconductor electro-optical phase shifter waveguide includes at least one linear portion between the modulation begin plane and the modulation end plane.

In still another example thereof, the semiconductor electro-optical phase shifter waveguide includes at least one non-linear portion between the modulation begin plane and the modulation end plane.

In a further exemplary embodiment of the present disclosure, a method of modulating an optical signal with an input electrical signal is provided. The method comprising: supporting an electrical transmission line of an electro-optical modulator on a substrate; supporting a semiconductor electro-optical phase shifter waveguide of the electro-optical modulator on the substrate, the semiconductor electro-optical phase shifter waveguide being non-parallel with the electrical transmission line; and connecting the electrical transmission line to the semiconductor electro-optical phase shifter waveguide with a plurality of spaced apart connections.

In an example thereof, the method further comprising the steps of: receiving an optical input signal into the semiconductor electro-optical phase shifter waveguide; propogating the input electrical signal along the electrical transmission line; and at each connection of the plurality of connections, altering an index of refraction of the semiconductor electro-optical phase shifter waveguide based on the input electrical signal.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplification set out herein illustrates an exemplary embodiment of the invention and such exemplification is not to be construed as limiting the scope of the invention in any manner.

DETAILED DESCRIPTION OF THE DRAWINGS

Figure 1:
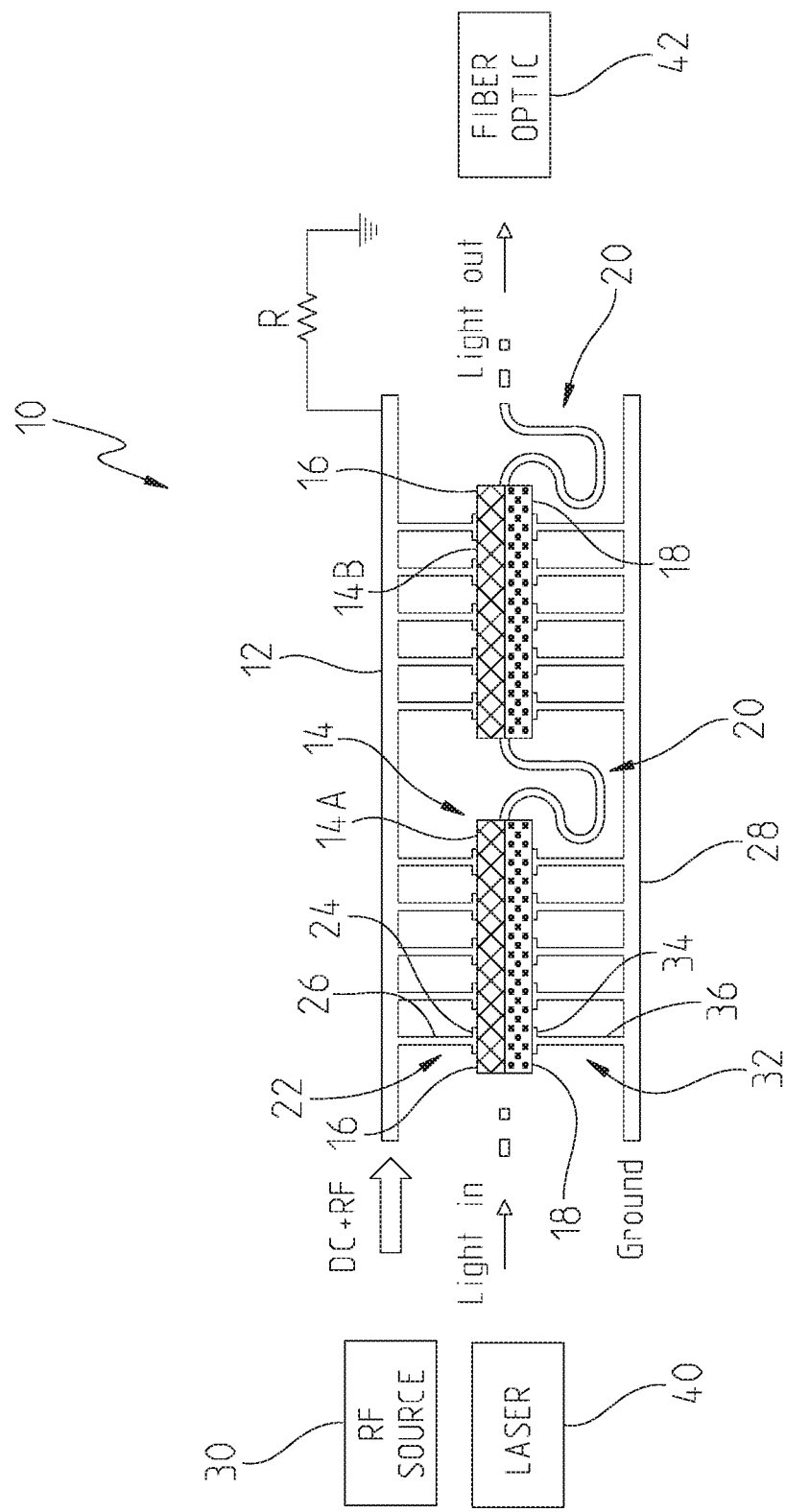
FIG. 1 illustrates a representative view of a traditional semiconductor electro-optical modulator.

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

In some instances throughout this disclosure and in the claims, numeric terminology, such as first, second, third, and fourth, is used in reference to various components or features. Such use is not intended to denote an ordering of the components or features. Rather, numeric terminology is used to assist the reader in identifying the component or features being referenced and should not be narrowly interpreted as providing a specific order of components or features.

Figure 2:
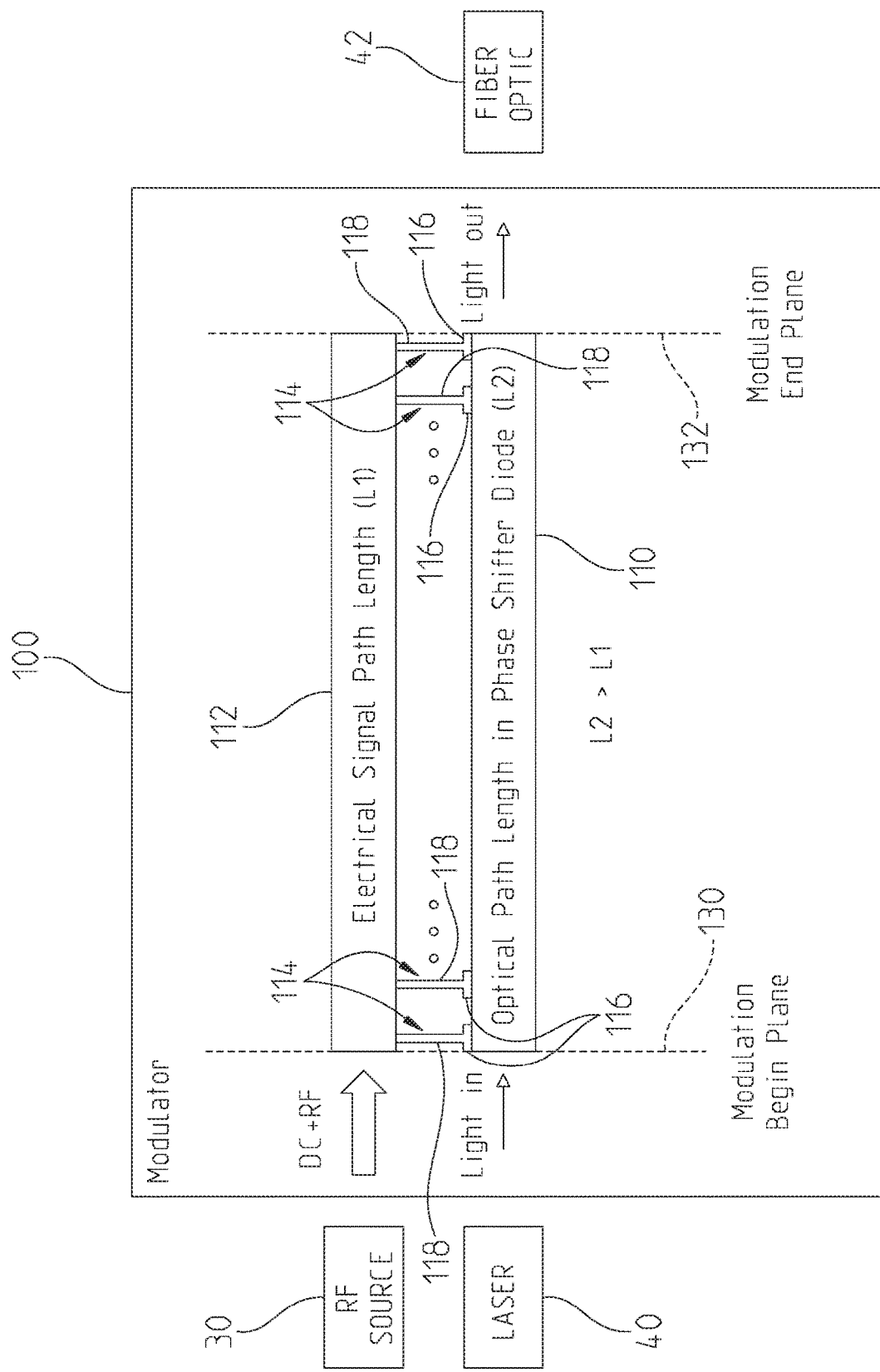
FIG. 2 illustrates a representative view of an exemplary semiconductor electro-optical modulator having an optical path length of an electro-optical phase shifter waveguide being longer than an electrical path length of a corresponding electrical transmission line.

Referring to FIG. 2, a representative view of a semiconductor electro-optical modulator 100 is illustrated. Semiconductor electro-optical modulator 100 receives an electrical drive signal from RF source 30 and light from a light source, illustratively laser 40. Semiconductor electro-optical modulator 100 modulates the light propagating through a semiconductor electro-optical phase shifter waveguide 110 with the electrical drive signal propagating along a electrical transmission line 112. Electrical transmission line 112 is electrically coupled to semiconductor electro-optical phase shifter waveguide 110 through a plurality of spaced apart electrical connectors 114. Electrical connectors 114 include conductive contacts 116 electrically coupled to semiconductor electro-optical phase shifter waveguide 110 and conductive connectors 118 electrically coupling electrical transmission line 112 to conductive contacts 116. In embodiments, semiconductor electro-optical phase shifter waveguide 110 includes a p-doped semiconductor portion and a n-doped semiconductor portion. Conductive connectors 118 are electrically connected to the p-doped portion of semiconductor electro-optical phase shifter waveguide 110.

In embodiments, semiconductor electro-optical phase shifter waveguide is made from any suitable semiconductor material suitable to guiding optical radiation. Exemplary materials and dopings include Si, GaAs, LiNbO$_3$, InP, AlGaAs, electro-optic polymer. Exemplary wavelengths of light compatible with the listed exemplary materials or other exemplary materials include 800-980 nm, 1260-1360 nm, 1530-1565 nm, and 1565-1670 nm.

As illustrated in FIG. 2, a modulation begin plane 130 and a modulation end plane 132 for semiconductor electro-optical phase shifter waveguide 110 are illustrated. Modulation begin plane 130 corresponds to the location along the optical path length (L2) of semiconductor electro-optical phase shifter waveguide 110 whereat the electrical drive signal of electrical transmission line 112 begins to modulate the light propagating along semiconductor electro-optical phase shifter waveguide 110. Prior to modulation begin plane 130, assuming a portion of semiconductor electro-optical phase shifter waveguide 110 extends prior to modulation begin plane 130, the light propagates along semiconductor electro-optical phase shifter waveguide 110 without being modulated by the electrical drive signal of electrical transmission line 112. Modulation end plane 132 corresponds to the location along the optical path length (L2) of semiconductor electro-optical phase shifter waveguide 110 whereat the electrical drive signal of electrical transmission line 112 ends modulating the light propagating along semiconductor electro-optical phase shifter waveguide 110, assuming a portion of semiconductor electro-optical phase shifter waveguide 110 extends beyond modulation end plane 132.

In embodiments, modulation begin plane 130 corresponds to the location along the optical path length (L2) of semiconductor electro-optical phase shifter waveguide 110 whereat a first one of conductive contacts 116 of spaced apart electrical connectors 114 begins interaction with the light propagating along semiconductor electro-optical phase shifter waveguide 110 and modulation end plane 132 corresponds to the location along the optical path length (L2) of semiconductor electro-optical phase shifter waveguide 110 whereat an ultimate one of conductive contacts 116 of spaced apart electrical connectors 114 ends interaction with the light propagating along semiconductor electro-optical phase shifter waveguide 110. In examples, modulation begin plane 130 corresponds to a location whereat the first one of conductive contacts 116 of spaced apart electrical connectors 114 begins contact with semiconductor electro-optical phase shifter waveguide 110 and modulation end plane 132 corresponds to a location whereat the ultimate one of conductive contacts 116 of spaced apart electrical connectors 114 ends contact with semiconductor electro-optical phase shifter waveguide 110.

The optical path length (L2) of semiconductor electro-optical phase shifter waveguide 110 from modulation begin plane 130 to modulation end plane 132 is longer than the electrical signal path length (L1) of the electrical drive signal along electrical transmission line 112 from modulation begin plane 130 to modulation end plane 132. Although both of semiconductor electro-optical phase shifter waveguide 110 and electrical transmission line 112 are shown as being positioned completely between modulation begin plane 130 and modulation end plane 132, in embodiments, an intermediate portion of semiconductor electro-optical phase shifter waveguide 110 and/or electrical transmission line 112 extends beyond one or both of modulation begin plane 130 and modulation end plane 132. In embodiments, the optical path length (L2) of semiconductor electro-optical phase shifter waveguide 110 from modulation begin plane 130 to modulation end plane 132 is non-parallel relative to the electrical signal path length (L1) of the electrical drive signal along electrical transmission line 112 from modulation begin plane 130 to modulation end plane 132. In embodiments, the optical path length (L2) of semiconductor electro-optical phase shifter waveguide 110 from modulation begin plane 130 to modulation end plane 132 is meandering relative to the electrical signal path length (L1) of the electrical drive signal along electrical transmission line 112 from modulation begin plane 130 to modulation end plane 132 which may be a linear electrical transmission line 112. An advantage, among others of the optical path length (L2) of semiconductor electro-optical phase shifter waveguide 110 from modulation begin plane 130 to modulation end plane 132 being longer than the electrical signal path length (L1) of the electrical drive signal along electrical transmission line 112 from modulation begin plane 130 to modulation end plane 132 is an improvement in the matching of the group velocities between the electrical and optical signals.

FIGS. 3-11 illustrate exemplary embodiments of semiconductor electro-optical modulators having a semiconductor electro-optical phase shifter waveguide with an optical path length from modulation begin plane 130 to modulation end plane 132 being longer the electrical signal path length along electrical transmission line from modulation begin plane 130 to modulation end plane 132. In embodiments, the optical path length from modulation begin plane 130 to modulation end plane 132 is at least 5% longer than the electrical signal path length along electrical transmission line from modulation begin plane 130 to modulation end plane 132. In embodiments, the optical path length from modulation begin plane 130 to modulation end plane 132 is in the range of 5% to 40% longer than the electrical signal path length along electrical transmission line from modulation begin plane 130 to modulation end plane 132. In embodiments, the optical path length from modulation begin plane 130 to modulation end plane 132 is in the range of 5% to 10% longer than the electrical signal path length along electrical transmission line from modulation begin plane 130 to modulation end plane 132. In embodiments, the optical path length from modulation begin plane 130 to modulation end plane 132 is in the range of 20% to 40% longer than the electrical signal path length along electrical transmission line from modulation begin plane 130 to modulation end plane 132.

Figure 3:
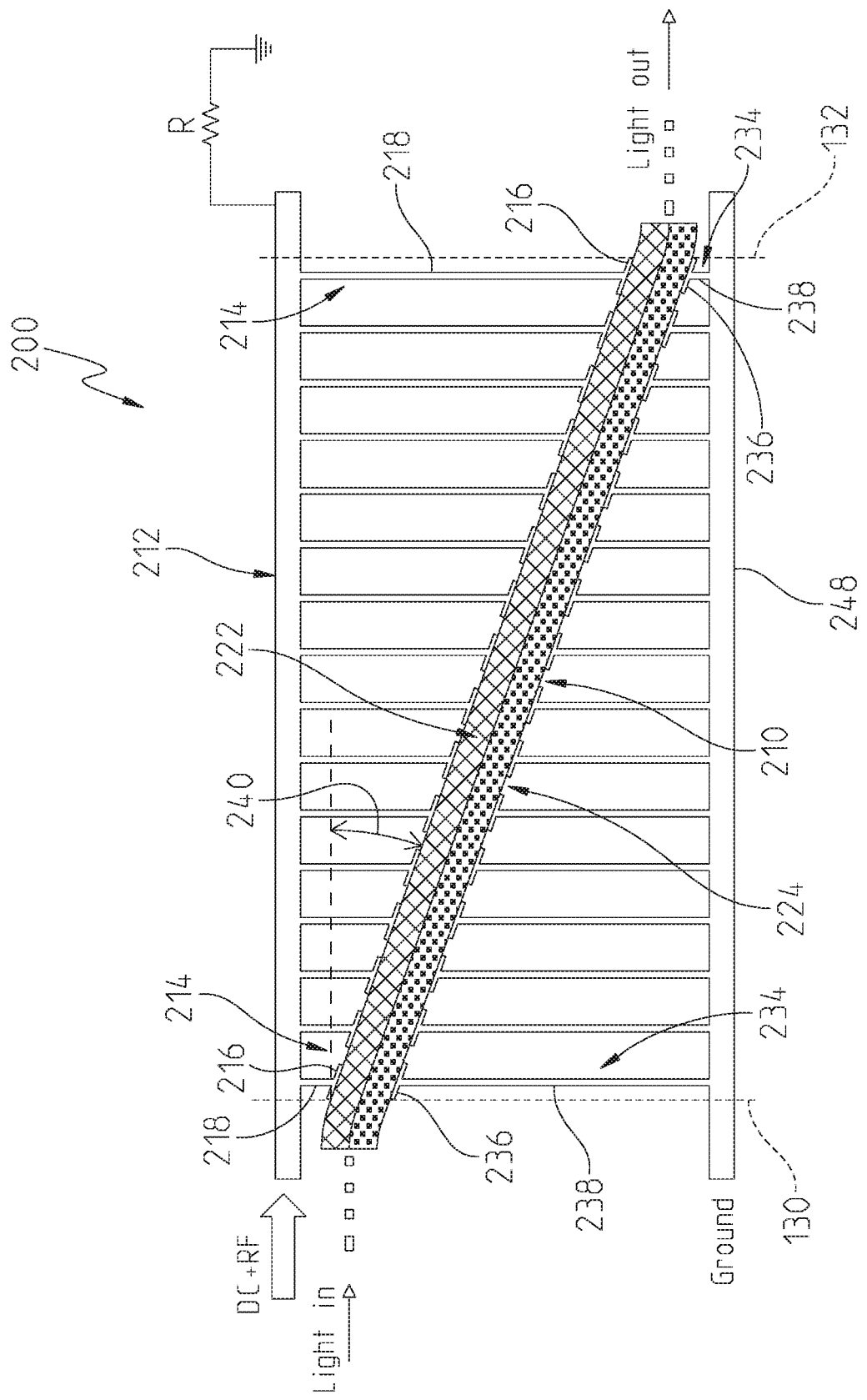
FIG. 3 illustrates an exemplary semiconductor electro-optical modulator of FIG. 2.

Referring to FIG. 3, an exemplary semiconductor electro-optical modulator 200 is illustrated having an optical path length (L2) of a semiconductor electro-optical phase shifter waveguide 210 from modulation begin plane 130 and modulation end plane 132 which is longer than the electrical signal path length (L1) of the electrical drive signal propagating along an electrical transmission line 212 from modulation begin plane 130 and modulation end plane 132. Semiconductor electro-optical modulator 200 receives an electrical drive signal from RF source 30 (not shown in FIG. 3) and light from a light source, such as laser 40 (not shown in FIG. 3). Semiconductor electro-optical modulator 200 modulates the light propagating through semiconductor electro-optical phase shifter waveguide 210 with the electrical drive signal propagating along electrical transmission line 212. Electrical transmission line 212 is electrically coupled to semiconductor electro-optical phase shifter waveguide 210 through a plurality of spaced apart electrical connectors 214. Electrical connectors 214 (two marked in FIG. 3) include conductive contacts 216 electrically coupled to semiconductor electro-optical phase shifter waveguide 210 and conductive connectors 218 electrically coupling electrical transmission line 212 to conductive contacts 216. In embodiments, semiconductor electro-optical phase shifter waveguide 210 includes a p-doped portion 222 and a n-doped portion 224. Spaced apart electrical connectors 214 are electrically connected to the p-doped portion 222 of semiconductor electro-optical phase shifter waveguide 210. Similar electrical connectors 234 (two marked in FIG. 3) having conductive contacts 236 and conductive connectors 238 which connect n-doped region 224 of semiconductor electro-optical phase shifter waveguide 210 to a reference voltage line 248, such as ground.

The optical path length (L2) of semiconductor electro-optical phase shifter waveguide 210 from modulation begin plane 130 to modulation end plane 132 is longer than the electrical signal path length (L1) of the electrical drive signal along electrical transmission line 212. As illustrated in FIG. 3, both electrical transmission line 212 and semiconductor electro-optical phase shifter waveguide 210 are linear between modulation begin plane 130 and modulation end plane 132. Semiconductor electro-optical phase shifter waveguide 210 is angled relative to electrical transmission line 212 by an angle 240. As such, the optical path length (L2) of semiconductor electro-optical phase shifter waveguide 210 is longer than the electrical path length (L1) of electrical transmission line 212 by a factor of the cosine of angle 240. This additional length, in effect, increases the time it takes for the light to travel from modulation begin plane 130 to modulation end plane 132 within semiconductor electro-optical phase shifter waveguide 210 and thereby increases the matching of the group velocities of the electrical and optical signals passing through semiconductor electro-optical modulator 200. Additionally, in embodiments, a spacing between spaced apart electrical connectors 314 may be increased, decreased, or varied between respective ones of spaced apart electrical connectors 314.

Figure 4:
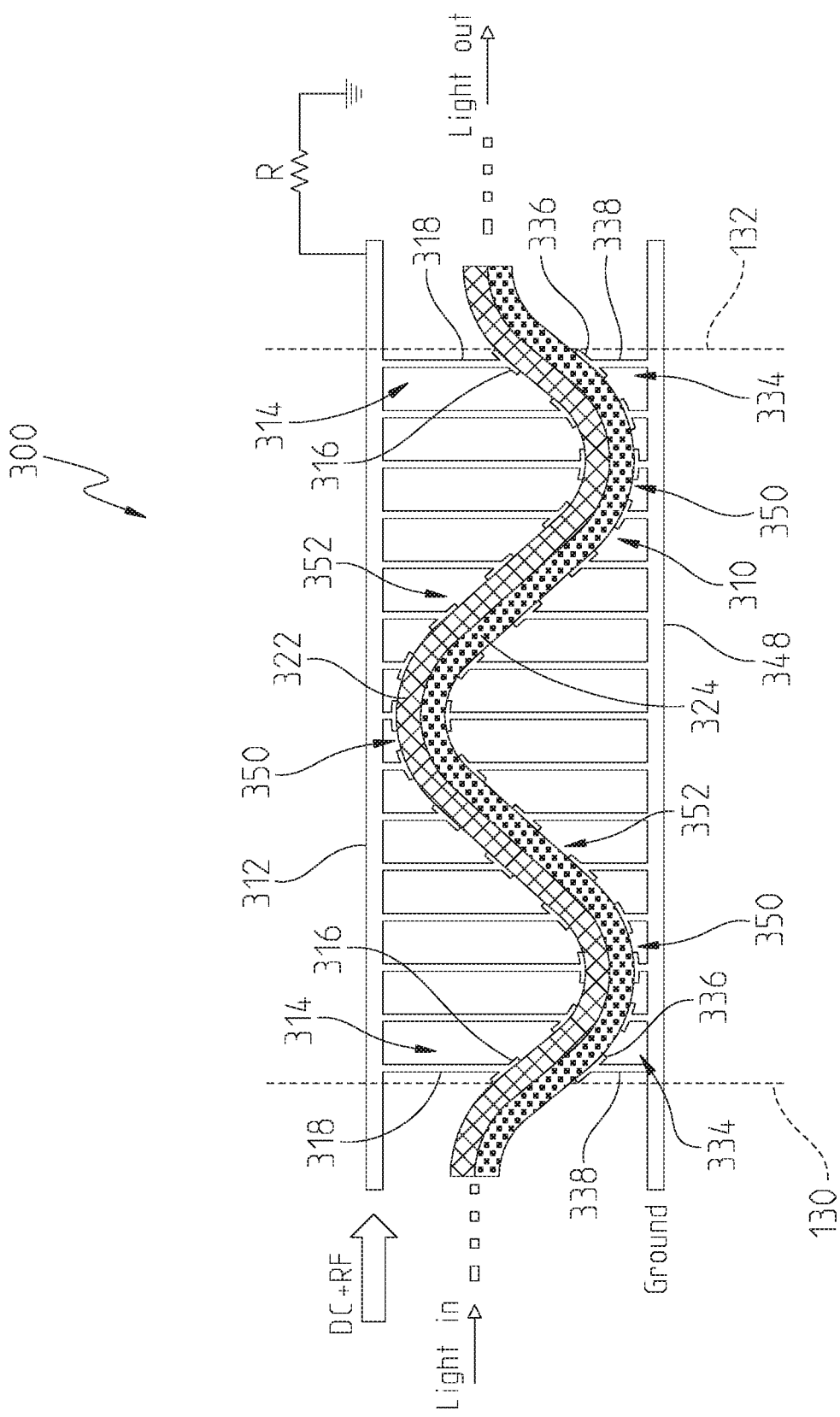
FIG. 4 illustrates another exemplary semiconductor electro-optical modulator of FIG. 2.

Referring to FIG. 4, an exemplary semiconductor electro-optical modulator 300 is illustrated having an optical path length (L2) of a semiconductor electro-optical phase shifter waveguide 310 from modulation begin plane 130 and modulation end plane 132 which is longer than the electrical signal path length (L1) of the electrical drive signal propagating along an electrical transmission line 312 from modulation begin plane 130 and modulation end plane 132. Semiconductor electro-optical modulator 300 receives an electrical drive signal from RF source 30 (not shown in FIG. 4) and light from a light source, such as laser 40 (not shown in FIG. 4). Semiconductor electro-optical modulator 300 modulates the light propagating through semiconductor electro-optical phase shifter waveguide 310 with the electrical drive signal propagating along electrical transmission line 312. Electrical transmission line 312 is electrically coupled to semiconductor electro-optical phase shifter waveguide 310 through a plurality of spaced apart electrical connectors 314. Electrical connectors 314 (two marked in FIG. 4) include conductive contacts 316 electrically coupled to semiconductor electro-optical phase shifter waveguide 310 and conductive connectors 318 electrically coupling electrical transmission line 312 to conductive contact 316. In embodiments, semiconductor electro-optical phase shifter waveguide 310 includes a p-doped portion 322 and a n-doped portion 324. Spaced apart electrical connectors 314 are electrically connected to the p-doped portion 322 of semiconductor electro-optical phase shifter waveguide 310. Similar electrical connectors 334 (two marked in FIG. 4) having conductive contacts 336 and conductive connectors 338 which connect n-doped region 324 of semiconductor electro-optical phase shifter waveguide 310 to a reference voltage line 348, such as ground.

The optical path length (L2) of semiconductor electro-optical phase shifter waveguide 310 from modulation begin plane 130 to modulation end plane 132 is longer than the electrical signal path length (L1) of the electrical drive signal along electrical transmission line 312. As illustrated in FIG. 4, semiconductor electro-optical phase shifter waveguide 310 is curved with multiple constant curvature portions 350 along semiconductor electro-optical phase shifter waveguide 310 with interconnecting linear portions 552. As such, the optical path length (L2) of semiconductor electro-optical phase shifter waveguide 310 is longer than the electrical path length (L1) of electrical transmission line 312 due to the curved path of semiconductor electro-optical phase shifter waveguide 310. This additional length, in effect, increases the time it takes for the light to travel from modulation begin plane 130 to modulation end plane 132 within semiconductor electro-optical phase shifter waveguide 310 and thereby increases the matching of the group velocities of the electrical and optical signals passing through semiconductor electro-optical modulator 300. Additionally, in embodiments, a spacing between spaced apart electrical connectors 314 may be increased, decreased, or varied between respective ones of spaced apart electrical connectors 314.

The linear portions 352 are angled relative to electrical transmission line 312 and thus lengthen the optical path length (L2) of semiconductor electro-optical phase shifter waveguide 310 by a cosine of the angle made with electrical transmission line 312. The constant curvature portions 350 also lengthen the optical path length (L2) of semiconductor electro-optical phase shifter waveguide 310 relative to electrical transmission line 312. As the radius of curvature of constant curvature portions 350 decreases the lengthening of the optical path length (L2) increases, but the potential for bending optical losses from semiconductor electro-optical phase shifter waveguide 310 increases. As the radius of curvature of constant curvature portions 350 increases the potential for bending losses from semiconductor electro-optical phase shifter waveguide 310 decreases, but the amount of lengthening of the optical path length (L2) decreases.

Figure 5:
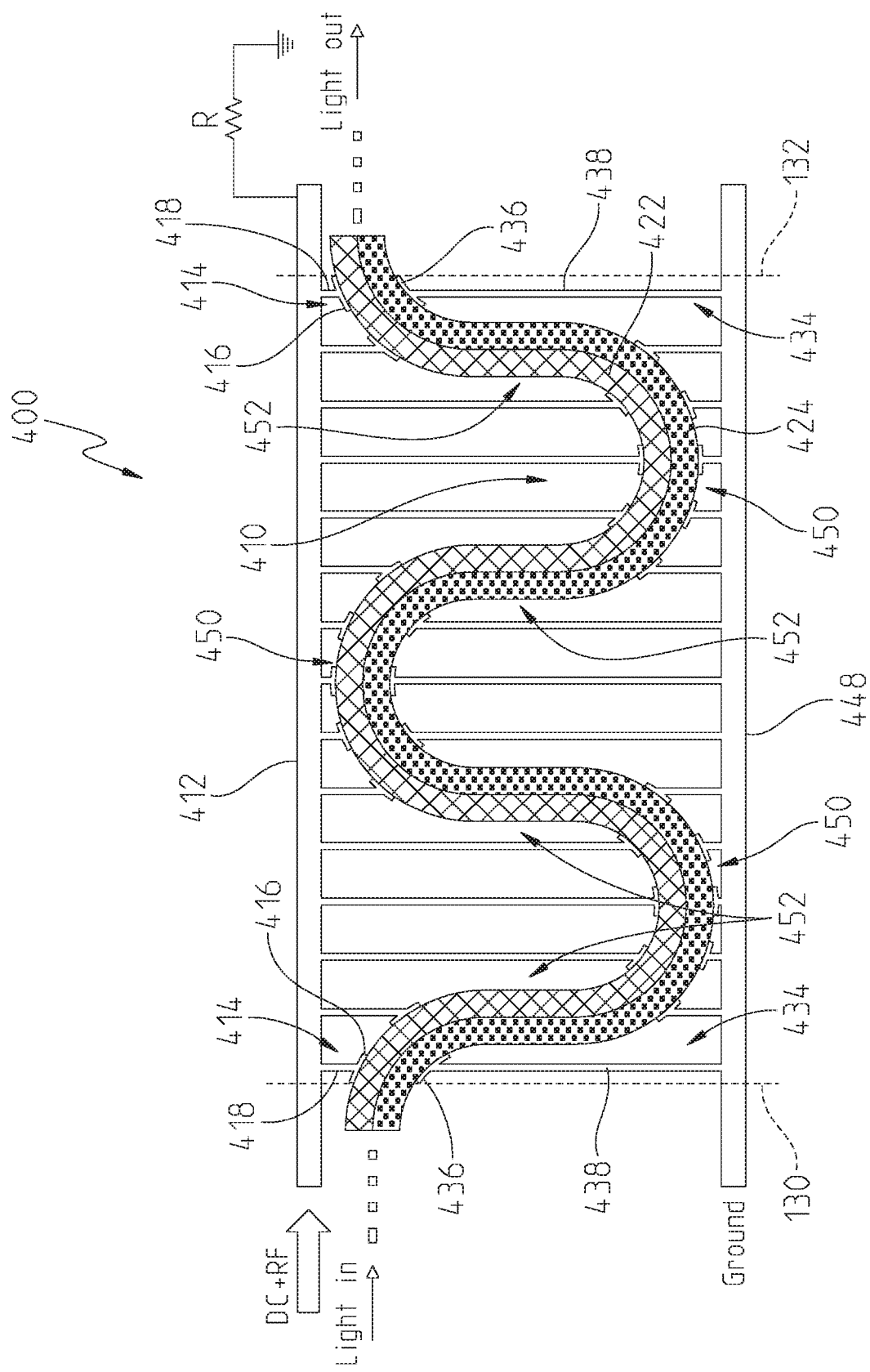
FIG. 5 illustrates a further exemplary semiconductor electro-optical modulator of FIG. 2.

Referring to FIG. 5, an exemplary semiconductor electro-optical modulator 400 is illustrated having an optical path length (L2) of a semiconductor electro-optical phase shifter waveguide 410 from modulation begin plane 130 and modulation end plane 132 which is longer than the electrical signal path length (L1) of the electrical drive signal propagating along an electrical transmission line 412 from modulation begin plane 130 and modulation end plane 132. Semiconductor electro-optical modulator 400 receives an electrical drive signal from RF source 30 (not shown in FIG. 5) and light from a light source, such as laser 40 (not shown in FIG. 5). Semiconductor electro-optical modulator 400 modulates the light propagating through semiconductor electro-optical phase shifter waveguide 410 with the electrical drive signal propagating along electrical transmission line 412. Electrical transmission line 412 is electrically coupled to semiconductor electro-optical phase shifter waveguide 410 through a plurality of spaced apart electrical connectors 414. Electrical connectors 414 (two marked in FIG. 5) include conductive contacts 416 electrically coupled to semiconductor electro-optical phase shifter waveguide 410 and conductive connectors 418 electrically coupling electrical transmission line 412 to conductive contact 416. In embodiments, semiconductor electro-optical phase shifter waveguide 410 includes a p-doped portion 422 and a n-doped portion 424. Spaced apart electrical connectors 414 are electrically connected to the p-doped portion 422 of semiconductor electro-optical phase shifter waveguide 410. Similar electrical connectors 434 (two marked in FIG. 5) having conductive contacts 436 and conductive connectors 438 which connect n-doped region 424 of semiconductor electro-optical phase shifter waveguide 410 to a reference voltage 448, such as ground.

The optical path length (L2) of semiconductor electro-optical phase shifter waveguide 410 from modulation begin plane 130 to modulation end plane 132 is longer than the electrical signal path length (L1) of the electrical drive signal along electrical transmission line 412. As illustrated in FIG. 5, semiconductor electro-optical phase shifter waveguide 410 is curved with multiple constant curvature portions 450 along semiconductor electro-optical phase shifter waveguide 410 with interconnecting linear portions 452. As such, the optical path length (L2) of semiconductor electro-optical phase shifter waveguide 410 is longer than the electrical path length (L1) of electrical transmission line 412 due to the curved path of semiconductor electro-optical phase shifter waveguide 410 and the spacing between electrical transmission line 412 and reference voltage line 448. This additional length, in effect, increases the time it takes for the light to travel from modulation begin plane 130 to modulation end plane 132 within semiconductor electro-optical phase shifter waveguide 410 and thereby increases the matching of the group velocities of the electrical and optical signals passing through semiconductor electro-optical modulator 400. The effective reduction of the optical group velocity in semiconductor electro-optical modulator 400 is based on the radius of curvature of the constant curvature sections 450 and the length of the vertically oriented linear portions 452 which are perpendicular to the linear electrical transmission line 412. Additionally, in embodiments, a spacing between spaced apart electrical connectors 414 may be increased, decreased, or varied between respective ones of spaced apart electrical connectors 414.

Figure 6:
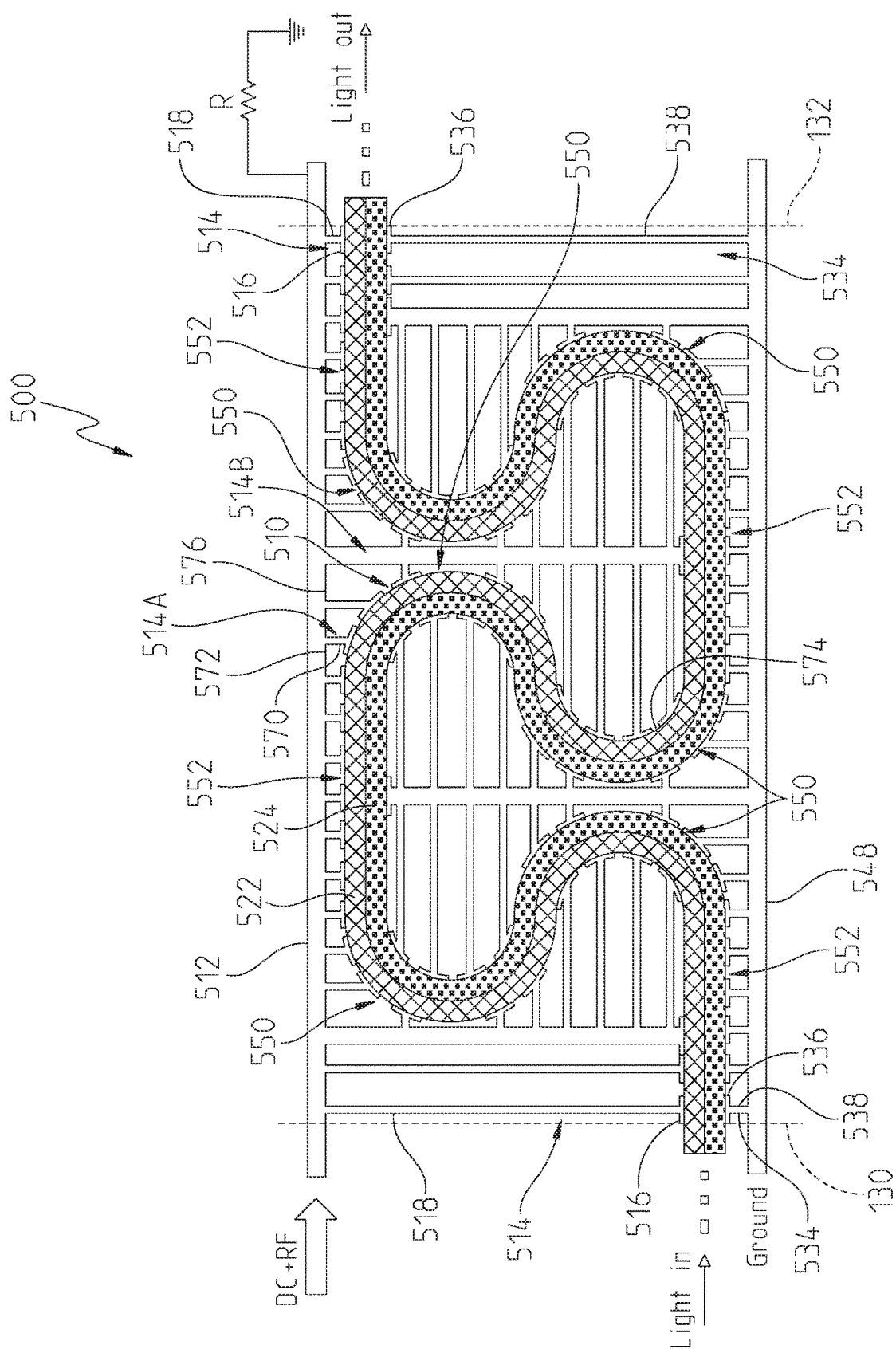
FIG. 6 illustrates yet another exemplary semiconductor electro-optical modulator of FIG. 2.

Referring to FIG. 6, an exemplary semiconductor electro-optical modulator 500 is illustrated having an optical path length (L2) of a semiconductor electro-optical phase shifter waveguide 510 from modulation begin plane 130 and modulation end plane 132 which is longer than the electrical signal path length (L1) of the electrical drive signal propagating along an electrical transmission line 512 from modulation begin plane 130 and modulation end plane 132. Semiconductor electro-optical modulator 500 receives an electrical drive signal from RF source 30 (not shown in FIG. 6) and light from a light source, such as laser 40 (not shown in FIG. 6). Semiconductor electro-optical modulator 500 modulates the light propagating through semiconductor electro-optical phase shifter waveguide 510 with the electrical drive signal propagating along electrical transmission line 512. Electrical transmission line 512 is electrically coupled to semiconductor electro-optical phase shifter waveguide 510 through a plurality of spaced apart electrical connectors 514. Electrical connectors 514 (two marked in FIG. 5) include conductive contacts 516 electrically coupled to semiconductor electro-optical phase shifter waveguide 510 and conductive connectors 518 electrically coupling electrical transmission line 512 to conductive contact 516. In embodiments, semiconductor electro-optical phase shifter waveguide 510 includes a p-doped portion 522 and a n-doped portion 524. Electrical connectors 514 are electrically connected to the p-doped portion 522 of semiconductor electro-optical phase shifter waveguide 510. Similar electrical connectors 534 (two marked in FIG. 6) having conductive contacts 536 and conductive connectors 538 which connect n-doped region 524 of semiconductor electro-optical phase shifter waveguide 510 to a reference voltage line 548, such as ground.

The optical path length (L2) of semiconductor electro-optical phase shifter waveguide 510 from modulation begin plane 130 to modulation end plane 132 is longer than the electrical signal path length (L1) of the electrical drive signal along electrical transmission line 512. As illustrated in FIG. 6, semiconductor electro-optical phase shifter waveguide 510 is curved with multiple constant curvature portions 550 along semiconductor electro-optical phase shifter waveguide 510 with interconnecting linear portions 552. The optical path length (L2) of semiconductor electro-optical phase shifter waveguide 510 is longer than the electrical path length (L1) of electrical transmission line 512 due to the curved path of semiconductor electro-optical phase shifter waveguide 510 and due to semiconductor electro-optical phase shifter waveguide 510 not progressing forward to modulation end plane 132 at all points along semiconductor electro-optical phase shifter waveguide 510. Rather, as shown in FIG. 6, semiconductor electro-optical phase shifter waveguide 510 reverses direction and double backs towards modulation begin plane 130.

For example, a third electrical connector 514A is connected to semiconductor electro-optical phase shifter waveguide 510 at a first location 570 along the optical path length of semiconductor electro-optical phase shifter waveguide 510 and is connected to electrical transmission line 512 at a second location 572 along the electrical path length of electrical transmission line 512. A fourth electrical connector 514B is connected to semiconductor electro-optical phase shifter waveguide 510 at a third location 574 along the optical path length of semiconductor electro-optical phase shifter waveguide 510 and is connected to electrical transmission line 512 at a fourth location 576 along the electrical path length of electrical transmission line 512. The third location 574 of fourth electrical connector 514B is further along the optical path length of semiconductor electro-optical phase shifter waveguide 510 than the first location 570 of third electrical connector 514A. The fourth location 576 of fourth electrical connector 514B is further along electrical transmission line 512 than the second location 572 of third electrical connector 514A. The third location 574 of fourth electrical connector 514B is closer to modulation begin plane 130 than the first location 570 of the third electrical connector 514A.

Figure 7:
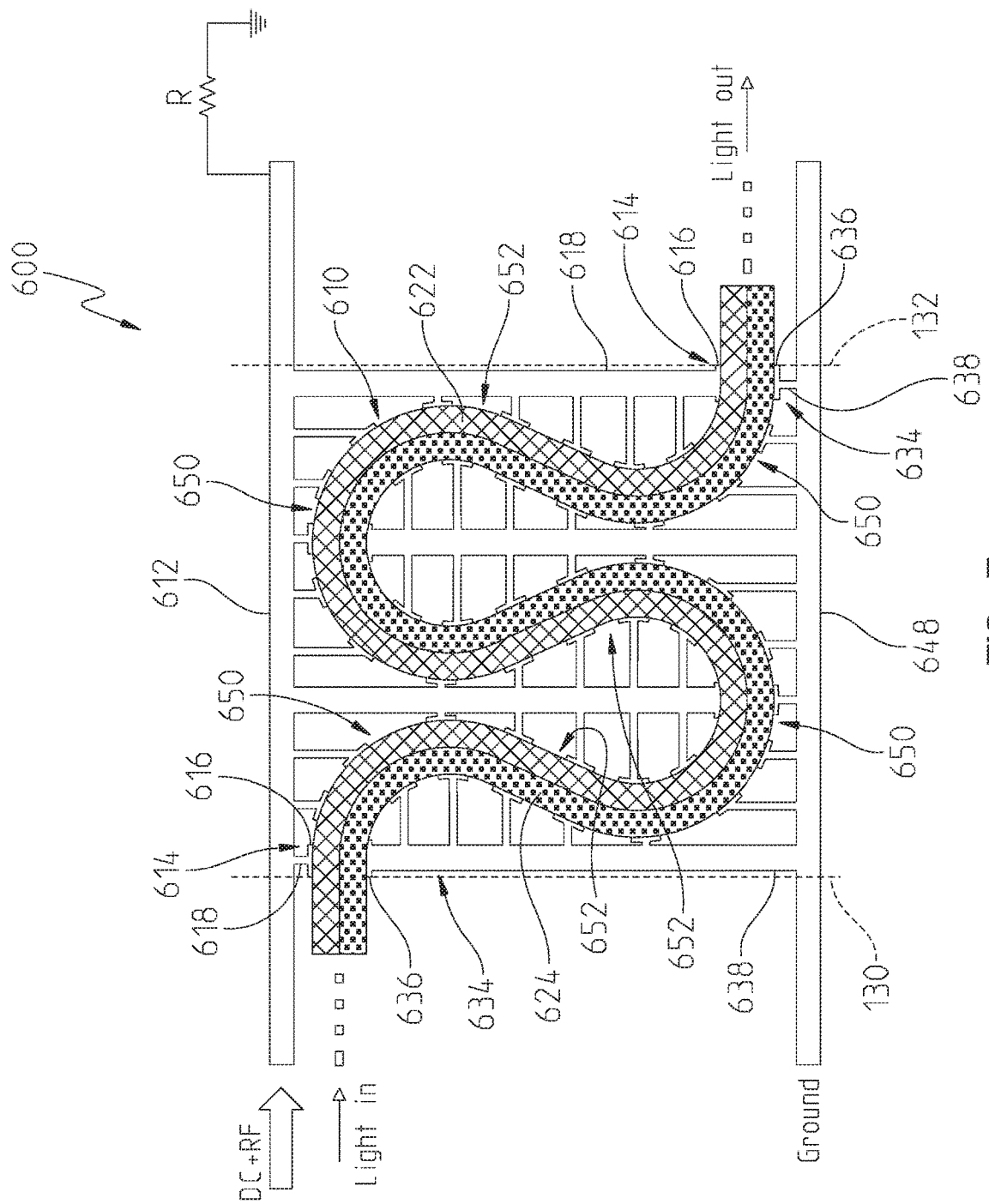
FIG. 7 illustrates yet a further exemplary semiconductor electro-optical modulator of FIG. 2.

Referring to FIG. 7, an exemplary semiconductor electro-optical modulator 600 is illustrated having an optical path length (L2) of a semiconductor electro-optical phase shifter waveguide 610 from modulation begin plane 130 and modulation end plane 132 which is longer than the electrical signal path length (L1) of the electrical drive signal propagating along an electrical transmission line 612 from modulation begin plane 130 and modulation end plane 132. Semiconductor electro-optical modulator 600 receives an electrical drive signal from RF source 30 (not shown in FIG. 7) and light from a light source, such as laser 40 (not shown in FIG. 7). Semiconductor electro-optical modulator 600 modulates the light propagating through semiconductor electro-optical phase shifter waveguide 610 with the electrical drive signal propagating along electrical transmission line 612. Electrical transmission line 612 is electrically coupled to semiconductor electro-optical phase shifter waveguide 610 through a plurality of spaced apart electrical connectors 614. Electrical connectors 614 (two marked in FIG. 7) include conductive contacts 616 electrically coupled to semiconductor electro-optical phase shifter waveguide 610 and conductive connectors 618 electrically coupling electrical transmission line 612 to conductive contacts 616. In embodiments, semiconductor electro-optical phase shifter waveguide 510 includes a p-doped portion 622 and a n-doped portion 624. Spaced apart electrical connectors 614 are electrically connected to the p-doped portion 622 of semiconductor electro-optical phase shifter waveguide 610. Similar electrical connectors 634 (two marked in FIG. 7) having conductive contacts 636 and conductive connectors 638 which connect n-doped region 624 of semiconductor electro-optical phase shifter waveguide 610 to a reference voltage line 648, such as ground.

The optical path length (L2) of semiconductor electro-optical phase shifter waveguide 610 from modulation begin plane 130 to modulation end plane 132 is longer than the electrical signal path length (L1) of the electrical drive signal along electrical transmission line 612. As illustrated in FIG. 7, semiconductor electro-optical phase shifter waveguide 610 is curved with multiple constant curvature portions 650 along semiconductor electro-optical phase shifter waveguide 610 with interconnecting linear portions 652. The optical path length (L2) of semiconductor electro-optical phase shifter waveguide 610 is longer than the electrical path length (L1) of electrical transmission line 612 due to the curved path of semiconductor electro-optical phase shifter waveguide 610 and due to semiconductor electro-optical phase shifter waveguide 610 not progressing forward to modulation end plane 132 at all points along semiconductor electro-optical phase shifter waveguide 610. Rather, as shown in FIG. 6, semiconductor electro-optical phase shifter waveguide 610 reverses direction and double backs towards modulation begin plane 130, similar to semiconductor electro-optical phase shifter waveguide 510 of semiconductor electro-optical modulator 500.

Figure 8:
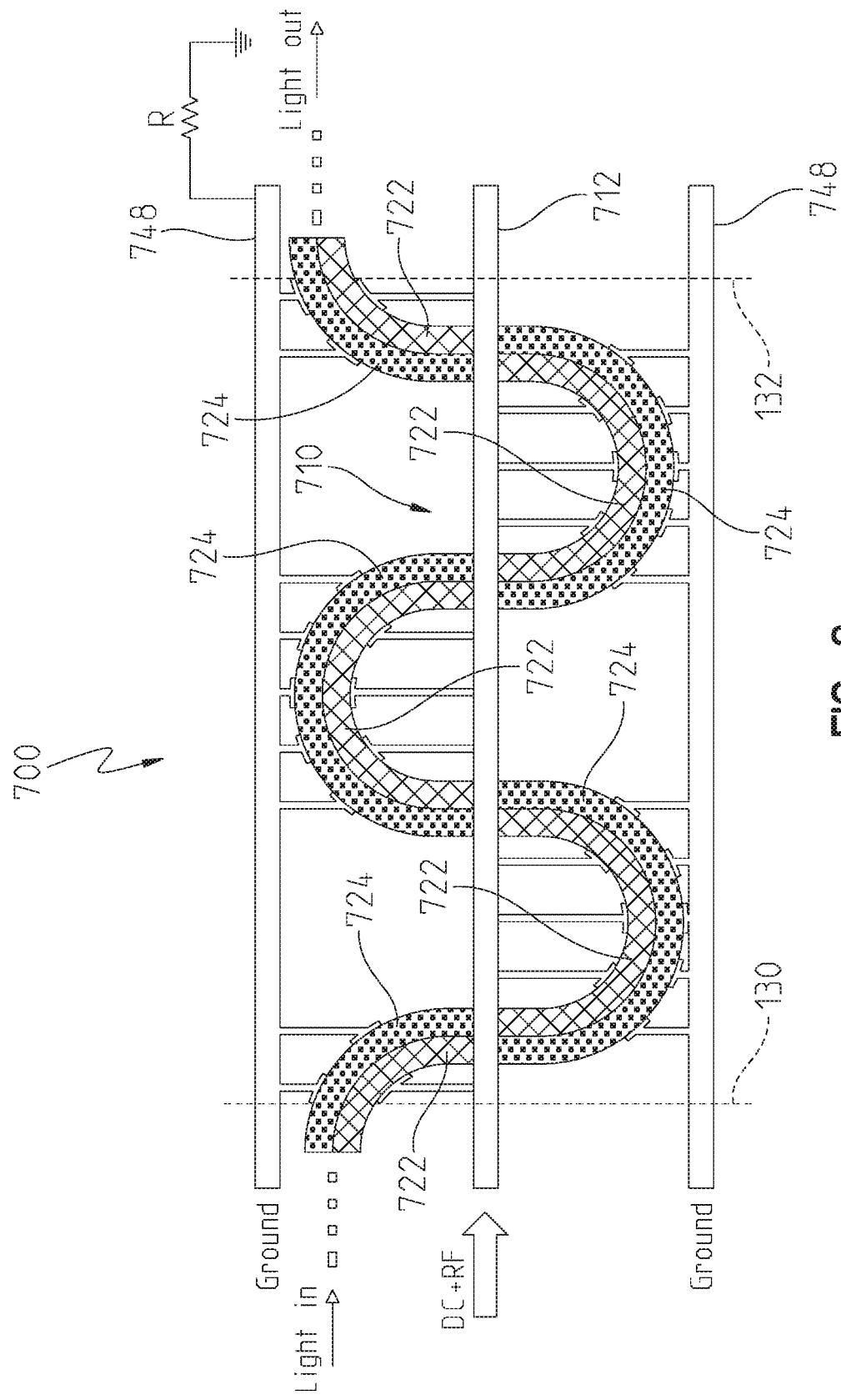
FIG. 8 illustrates a further yet exemplary semiconductor electro-optical modulator of FIG. 2.

Referring to FIG. 8, an exemplary semiconductor electro-optical modulator 700 is illustrated having an optical path length (L2) of a semiconductor electro-optical phase shifter waveguide 710 from modulation begin plane 130 and modulation end plane 132 which is longer than the electrical signal path length (L1) of the electrical drive signal propagating along an electrical transmission line 712 from modulation begin plane 130 and modulation end plane 132. Semiconductor electro-optical phase shifter waveguide 710 has the same shape as semiconductor electro-optical phase shifter waveguide 410 in FIG. 5.

Semiconductor electro-optical modulator 700 differs from semiconductor electro-optical modulator 500 in FIG. 5 in that semiconductor electro-optical phase shifter waveguide 710 spans two sides of electrical transmission line 712. In particular, semiconductor electro-optical phase shifter waveguide 710 is positioned at a level below electrical transmission line 712 in the fabrication process. As semiconductor electro-optical phase shifter waveguide 710 passes below electrical transmission line 712, the doping of semiconductor electro-optical phase shifter waveguide 710 is flipped, as illustrated in FIG. 8. Any of the semiconductor electro-optical modulators disclosed herein may take the form of semiconductor electro-optical modulator 700 wherein the respective semiconductor electro-optical phase shifter waveguide spans two sides of the respective electrical transmission line.

Figure 9:
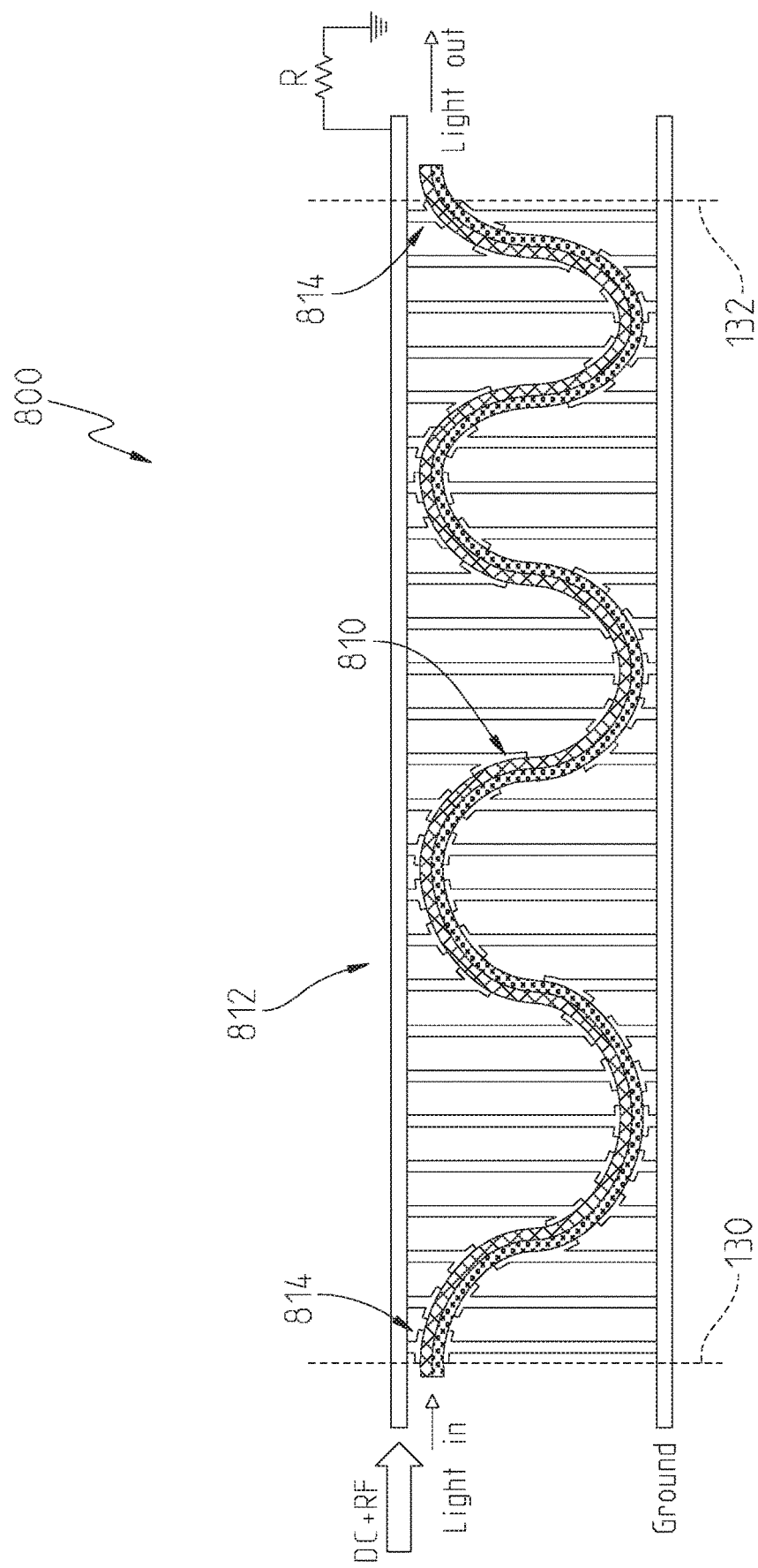
FIG. 9 illustrates a still a further exemplary semiconductor electro-optical modulator of FIG. 2.

Referring to FIG. 9, an exemplary semiconductor electro-optical modulator 800 is illustrated having an optical path length (L2) of a semiconductor electro-optical phase shifter waveguide 810 (note waveguide 810 includes p-doped and n-doped regions, but are not illustrated) from modulation begin plane 130 and modulation end plane 132 which is longer than the electrical signal path length (L1) of the electrical drive signal propagating along an electrical transmission line 812 from modulation begin plane 130 and modulation end plane 132.

Semiconductor electro-optical phase shifter waveguide 810 has a non-repeating pattern. Advantages, among others, of having a non-repeating pattern or period of semiconductor electro-optical phase shifter waveguide 810 is a reduction in the potential for producing a standing wave along semiconductor electro-optical phase shifter waveguide 810, a reduction in the potential for producing a standing wave along the electrical transmission line 812, and a reduction in the potential for producing electrical and optical backreflections into the RF source or laser source, respectively. In other embodiments, semiconductor electro-optical phase shifter waveguide 810 may have a repeating pattern or period and the spacing of electrical connectors 814 is varied to reduce the potential of producing a standing wave along semiconductor electro-optical phase shifter waveguide 810.

Figure 10:
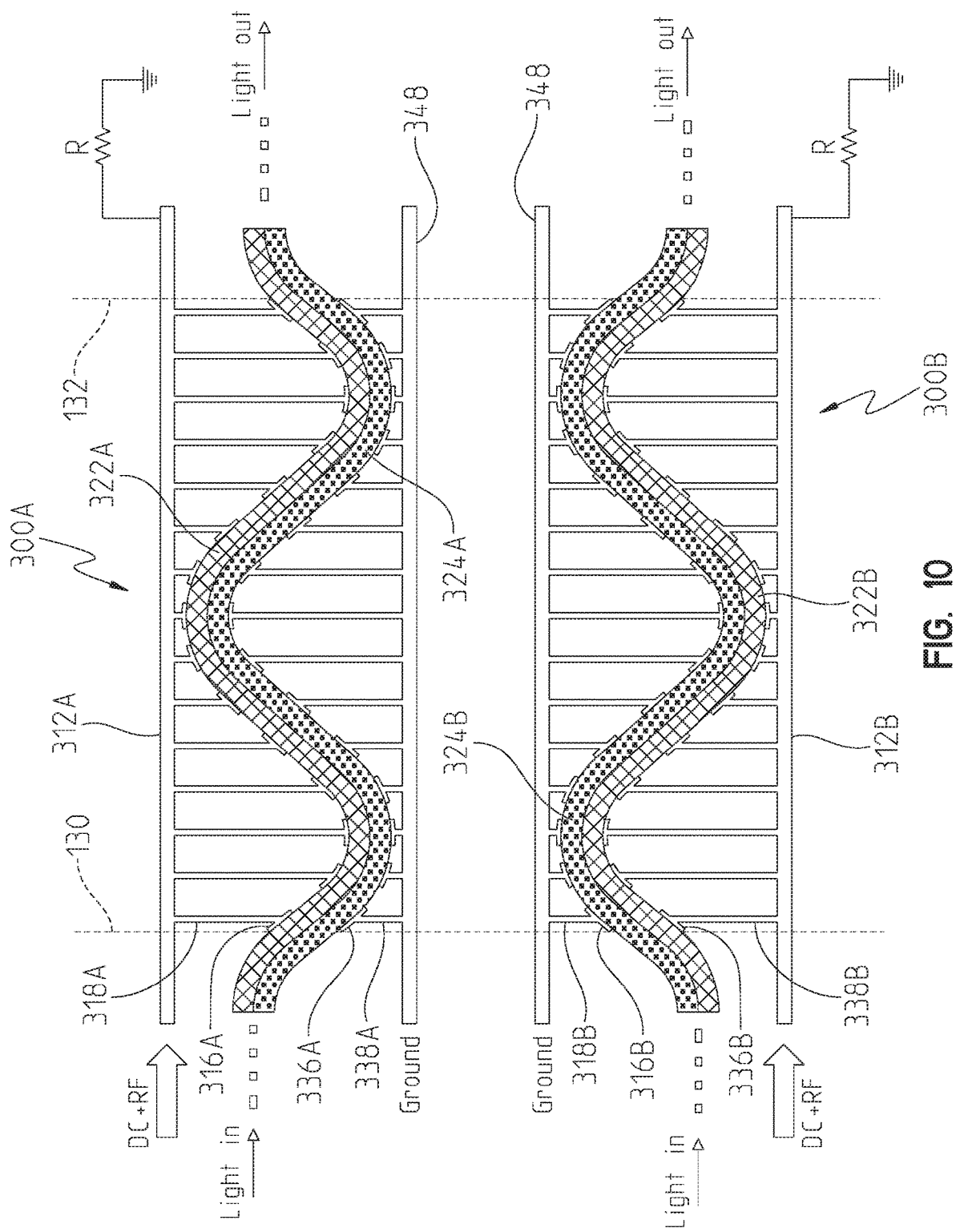
FIG. 10 illustrates an exemplary differential drive including multiple semiconductor electro-optical modulators.
Figure 10A:
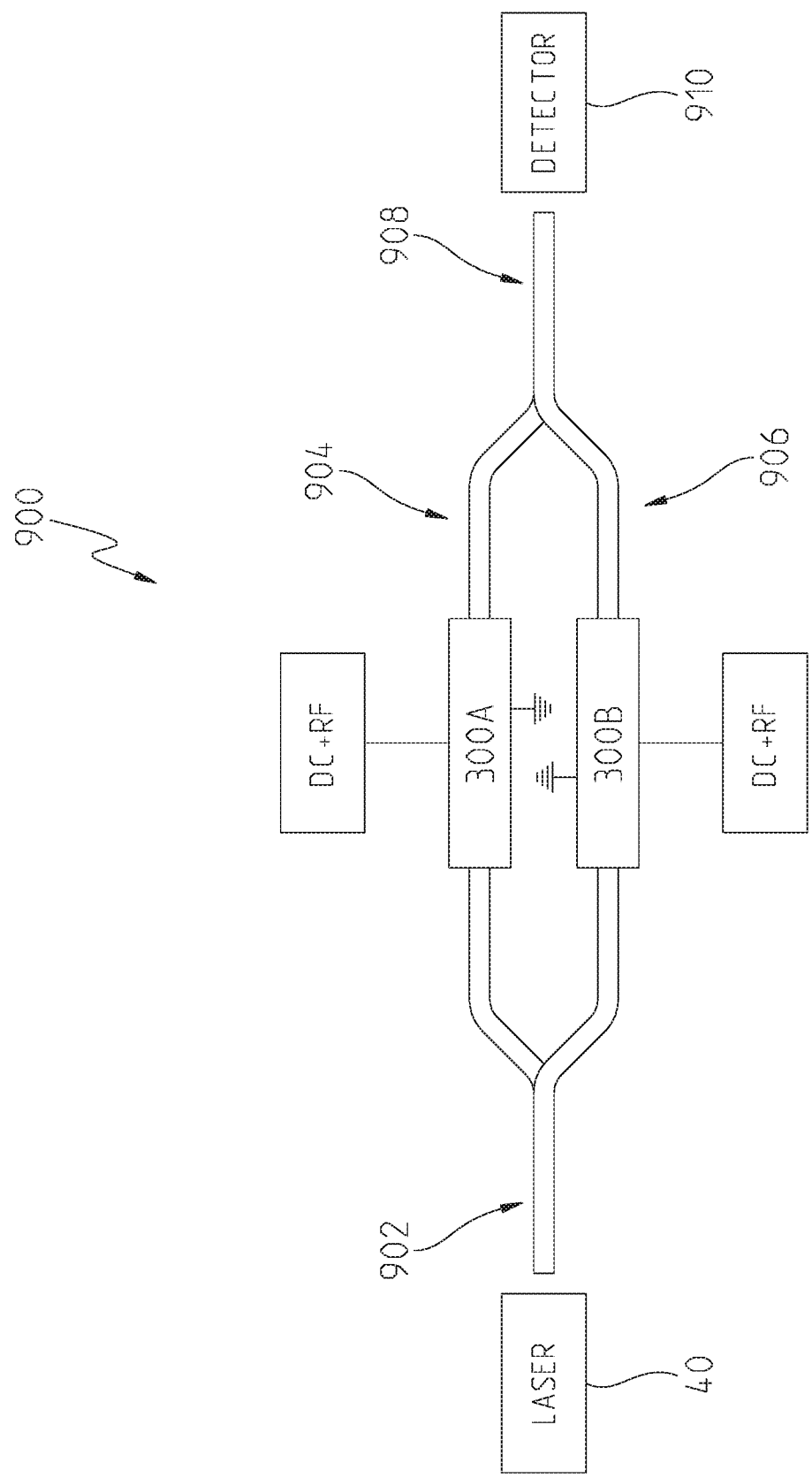
FIG. 10A illustrates an exemplary Mach-Zehnder interferometer incorporating the modulators of FIG. 10.

Referring to FIG. 10, a pair of semiconductor electro-optical modulators 300A, 300B are illustrated which may be positioned adjacent each other on a chip. In embodiments, the pair of semiconductor electro-optical modulators 300A, 300B may be incorporated into the arms of a Mach-Zehnder interferometer 900, represented in FIG. 10A. Referring to FIG. 10A, Mach-Zehnder interferometer 900 includes a waveguide 902 which receives light from a laser source 40. Waveguide 902 directs the received light along its length to arm 904 and arm 906. Semiconductor electro-optical modulator 300A is provided in a first arm 904 of the Mach-Zehnder interferometer 900 and semiconductor electro-optical modulator 300B is provided in a second arm 906 of the Mach-Zehnder interferometer 900. One or both of semiconductor electro-optical modulators 300A, 300B modulate the light traveling through the respective arm 904, 906 with a respective electrical RF signal. In embodiments, the RF signal for semiconductor electro-optical modulator 300A differs from the RF signal for semiconductor electro-optical modulator 300B. The modulated light from semiconductor electro-optical modulator 300A and semiconductor electro-optical modulator 300B is carried by an output waveguide 908 to one or more detectors 910. In embodiments, Mach-Zehnder interferometer 900 only includes a single semiconductor electro-optical modulator, such as semiconductor electro-optical modulator 300A and arm 906 does not include a semiconductor electro-optical modulator. Although Mach-Zehnder interferometer 900 is illustrated as incorporating semiconductor electro-optical modulators 300A, 300B, the other semiconductor electro-optical modulators disclosed herein may be used instead.

Figure 11:
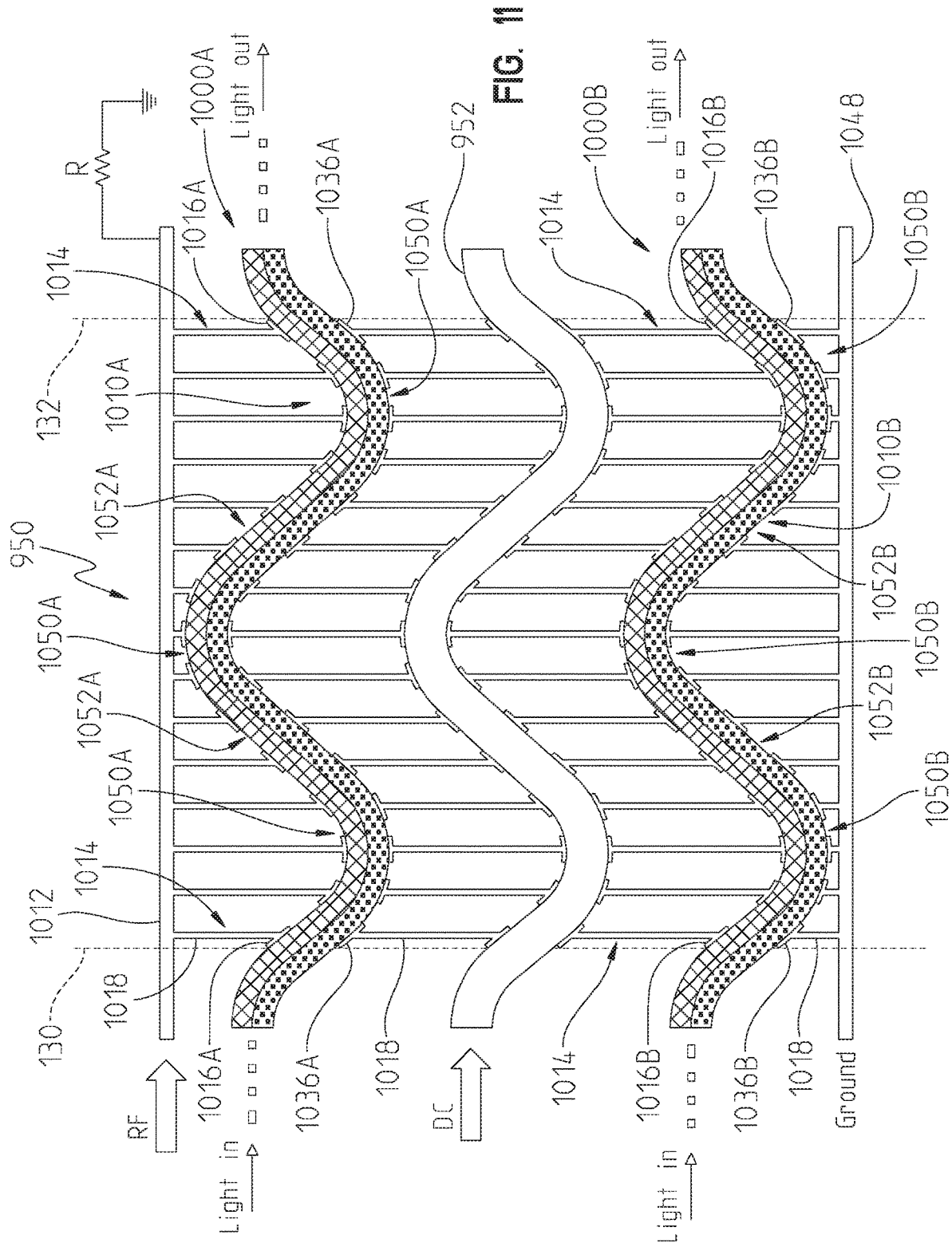
FIG. 11 illustrates an exemplary single drive including multiple semiconductor electro-optical modulators.

Referring to FIG. 11, an arrangement 950 is shown wherein a plurality of exemplary semiconductor electro-optical modulators 1000A, 1000B have a common DC bias line 952. Each of semiconductor electro-optical modulators 1000A, 1000B is illustrated having an optical path length (L2) of a semiconductor electro-optical phase shifter waveguide 1010A, 1010B from modulation begin plane 130 and modulation end plane 132 which is longer than the electrical signal path length (L1) of the electrical drive signal propagating along an electrical transmission line 1012 from modulation begin plane 130 and modulation end plane 132. Each of semiconductor electro-optical modulators 1000A, 1000B receives an electrical drive signal from RF source 30 (not shown in FIG. 11) along electrical transmission line 1012 and light from a light source, such as laser 40 (not shown in FIG. 11). Each of semiconductor electro-optical modulators 1000A, 1000B modulates the light propagating through the respective semiconductor electro-optical modulator 1000A, 1000B with the electrical drive signal propagating along electrical transmission line 1012. Electrical transmission line 1012 is electrically coupled to respective semiconductor electro-optical phase shifter waveguide 1010A, 1010B of each of semiconductor electro-optical modulators 1000A, 1000B through a plurality of spaced apart electrical connectors 1014.

Electrical connectors 1014 (four marked in FIG. 11) include conductive contacts 1016A, 1016B electrically coupled to a first side of the respective semiconductor electro-optical phase shifter waveguide 1010A, 1010B and conductive contacts 1036A, 10136B electrically coupled to a second side of the respective semiconductor electro-optical phase shifter waveguide 1010A, 1010B. Additionally, electrical connectors 1014 include conductive connectors 1018 having segments attached between electrical transmission line 1012 and conductive contacts 1016A, attached between conductive contacts 1016B and conductive contacts 1036A, and attached between conductive contacts 1036B and a ground line 1048. A DC bias provided along line 952 is also connected to the plurality of spaced apart electrical connectors 1014 along the segments attached between conductive contacts 1036A and conductive contacts 1016B.

In embodiments, each of semiconductor electro-optical phase shifter waveguide 1010A, 1010B includes a p-doped portion 1022A, 1022B and a n-doped portion 1024A, 1024B. Spaced apart electrical connectors 1014 are electrically connected to the p-doped portion 1022A, 1022B and to the n-doped portion 1024A, 1024B of semiconductor electro-optical phase shifter waveguide 1010A, 1010B. The semiconductor electro-optical phase shifter waveguide 1010A, 1010B are two arms which use a signal-ground-signal electrode.

As illustrated in FIG. 11, each of semiconductor electro-optical phase shifter waveguides 1010A, 1010B is curved with multiple constant curvature portions 1050A, 1050B along the respective semiconductor electro-optical phase shifter waveguide 1010A, 1010B with interconnecting linear portions 1052A, 1052B. As such, the optical path length (L2) of each of semiconductor electro-optical phase shifter waveguides 1010A, 1010B is longer than the electrical path length (L1) of electrical transmission line 1012 due to the curved path of each of semiconductor electro-optical phase shifter waveguides 1010A, 1010B. This additional length, in effect, increases the time it takes for the light to travel from modulation begin plane 130 to modulation end plane 132 within the respective semiconductor electro-optical phase shifter waveguide 1010A, 1010B and thereby increases the matching of the group velocities of the electrical and optical signals passing through semiconductor electro-optical modulators 1000A, 1000B. Additionally, in embodiments, a spacing between spaced apart electrical connectors 1014 may be increased, decreased, or varied between respective ones of spaced apart electrical connectors 1014.

An advantage, among others, of the disclosed semiconductor electro-optical modulators is that traditional silicon photonic fabrication processes may be used for fabrication. For example, a silicon-on-insulator (SOI) wafer with a SOI thickness of about 220 nm may be used. Portions of the SOI layer are selectively etched to about a 100 nm thickness to form partial-etch areas of the waveguides. Portions of the SOI layer are selectively removed to form the waveguide shapes. p and n dopants are implanted in appropriate regions of waveguides. Ohmic contacts to the waveguide wing regions are formed using, for example, silicidation. One or more layers of metal and/or vias are deposited as appropriate to form electrical transmission lines.

An advantage, among others, of the disclosed semiconductor electro-optical modulators is the elimination of insertion loss from the inclusion of undoped waveguide sections and potentially reduce optical backreflection. An advantage, among others, of the disclosed semiconductor electro-optical modulators is smaller packaging size due to a reduced modulator length, in part, caused by elimination of undoped waveguide sections. An advantage, among others, of a shorter length semiconductor electro-optical modulator is a higher intrinsic bandwidth due to a shorter electrical transmission line allowing for lower power consumption in the driver circuit for the electrical transmission line and higher efficiency results in potential for lower driver voltage.

While this invention has been described as having exemplary designs, the present invention can be further modified within the spirit and scope of this disclosure. This application is therefore intended to cover any variations, uses, or adaptations of the invention using its general principles.

Further, this application is intended to cover such departures from the present disclosure as come within known or customary practice in the art to which this invention pertains.

We claim:

1. A semiconductor electro-optical modulator which receives an input optical signal and provides a modulated output optical signal based on an input electrical signal, the semiconductor electro-optical modulator comprising:
   at least one electrical transmission line adapted to carry the input electrical signal;
   a semiconductor electro-optical phase shifter waveguide having a p-doped portion and a n-doped portion, an input end adapted to receive the input optical signal, and an output end whereat the modulated output optical signal exits the semiconductor electro-optical phase shifter waveguide; and
   a plurality of electrical connectors electrically coupling the at least one electrical transmission line to the semiconductor electro-optical phase shifter waveguide, the semiconductor electro-optical phase shifter waveguide having a modulation begin plane corresponding to a connection of a first electrical connector of the plurality of electrical connectors to the semiconductor electro-optical phase shifter waveguide and a modulation end plane corresponding to a connection of a second first electrical connector of the plurality of electrical connectors to the semiconductor electro-optical phase shifter waveguide, wherein an optical path length of the semiconductor electro-optical phase shifter waveguide between the modulation begin plane and the modulation end plane is greater than an electrical path length of the at least one electrical transmission line between the modulation begin plane and the modulation end plane.

2. The semiconductor electro-optical modulator of claim 1, wherein the optical path length of the semiconductor electro-optical phase shifter waveguide is linear.

3. The semiconductor electro-optical modulator of claim 1, wherein the optical path length of the semiconductor electro-optical phase shifter waveguide includes a non-linear portion.

4. The semiconductor electro-optical modulator of claim 3, wherein the non-linear portion of the semiconductor electro-optical phase shifter waveguide includes a first portion having a constant curvature.

5. The semiconductor electro-optical modulator of claim 3, wherein the semiconductor electro-optical phase shifter waveguide further includes a linear portion.

6. The semiconductor electro-optical modulator of claim 5, wherein the linear portion of the semiconductor electro-optical phase shifter waveguide is parallel to the electrical transmission line.

7. The semiconductor electro-optical modulator of claim 5, wherein the linear portion of the semiconductor electro-optical phase shifter waveguide is angled relative to the electrical transmission line.

8. The semiconductor electro-optical modulator of claim 7, wherein the linear portion of the semiconductor electro-optical phase shifter waveguide is perpendicular to the electrical transmission line.

9. The semiconductor electro-optical modulator of claim 1, wherein the plurality of electrical connectors further includes:
   a third electrical connector positioned along the optical path length of the semiconductor electro-optical phase shifter waveguide at a first location between the modulation begin plane and the modulation end plane and connected to the electrical transmission line at a second location along the electrical transmission line between the modulation begin plane and the modulation end plane; and
   a fourth electrical connector positioned along the optical path length of the semiconductor electro-optical phase shifter waveguide at a third location, the third location being further along the optical path length of the semiconductor electro-optical phase shifter than the first location, and connected to the electrical transmission line at a fourth location along the electrical transmission line, the fourth location being further along the electrical transmission line than the second location.

10. The semiconductor electro-optical modulator of claim 9, wherein the third location of the fourth connector of the plurality of connectors is closer to the modulation begin plane than the first location of the third connector of the plurality of connectors.

11. The semiconductor electro-optical modulator of claim 1, wherein the semiconductor electro-optical phase shifter waveguide is positioned on both a first side of the electrical transmission line and a second side of the electrical transmission line, opposite the first side.

12. A semiconductor electro-optical modulator which receives an input optical signal and provides a modulated output optical signal based on an input electrical signal, the semiconductor electro-optical modulator comprising:
   at least one electrical transmission line adapted to carry the input electrical signal;
   a semiconductor electro-optical phase shifter waveguide having a p-doped portion and a n-doped portion, an input end adapted to receive the input optical signal, and an output end whereat the modulated output optical signal exits the semiconductor electro-optical phase shifter waveguide; and
   a plurality of electrical connectors electrically coupling the at least one electrical transmission line to the semiconductor electro-optical phase shifter waveguide, the semiconductor electro-optical phase shifter waveguide extending from a modulation begin plane corresponding to a connection of a first electrical connector of the plurality of electrical connectors to the semiconductor electro-optical phase shifter waveguide to a modulation end plane corresponding to a connection of a second first electrical connector of the plurality of electrical connectors to the semiconductor electro-optical phase shifter waveguide, wherein the semiconductor electro-optical phase shifter waveguide is angled relative to the at least one electrical transmission line between the modulation begin plane and the modulation end plane resulting in a separation between the semiconductor electro-optical phase shifter waveguide and the at least one electrical transmission line varies between the modulation begin plane and the modulation end plane.

13. The semiconductor electro-optical modulator of claim 12, wherein the at least one electrical transmission line is linear between the modulation begin plane and the modulation end plane.

14. The semiconductor electro-optical modulator of claim 13, wherein the semiconductor electro-optical phase shifter waveguide is linear between the modulation begin plane and the modulation end plane.

15. The semiconductor electro-optical modulator of claim 12, wherein the semiconductor electro-optical phase shifter waveguide is linear between the modulation begin plane and the modulation end plane.

16. The semiconductor electro-optical modulator of claim 12, wherein the semiconductor electro-optical phase shifter waveguide includes at least one linear portion between the modulation begin plane and the modulation end plane.

17. The semiconductor electro-optical modulator of claim 12, wherein the semiconductor electro-optical phase shifter waveguide includes at least one non-linear portion between the modulation begin plane and the modulation end plane.

18. A method of modulating an optical signal with an input electrical signal, the method comprising:
  supporting an electrical transmission line of an electro-optical modulator on a substrate;
  supporting a semiconductor electro-optical phase shifter waveguide of the electro-optical modulator on the substrate, the semiconductor electro-optical phase shifter waveguide being non-parallel with the electrical transmission line, and the semiconductor electro-optical phase shifter waveguide being longer in length than the electrical transmission line; and
  connecting the electrical transmission line to the semiconductor electro-optical phase shifter waveguide with a plurality of spaced apart connections.

19. The method of claim 18, further comprising the steps of:
  receiving an optical input signal into the semiconductor electro-optical phase shifter waveguide;
  propagating the input electrical signal along the electrical transmission line; and
  at each connection of the plurality of connections, altering an index of refraction of the semiconductor electro-optical phase shifter waveguide based on the input electrical signal.

* * * * *